(12) United States Patent
Watanabe et al.

(10) Patent No.: US 7,803,081 B2
(45) Date of Patent: Sep. 28, 2010

(54) SYSTEM AND METHOD OF CONTROLLING AUTOMATIC TRANSMISSION

(75) Inventors: Tomoharu Watanabe, Shizuoka (JP);
Hirofumi Michioka, Kanagawa (JP);
Kazunari Otake, Shizuoka (JP)

(73) Assignee: Jatco Ltd, Fuji-shi (JP)

( * ) Notice: Subject to any disclaimer, the term of this patent is extended or adjusted under 35 U.S.C. 154(b) by 568 days.

(21) Appl. No.: 11/856,393

(22) Filed: Sep. 17, 2007

(65) Prior Publication Data
US 2008/0076632 A1    Mar. 27, 2008

(30) Foreign Application Priority Data
Sep. 25, 2006    (JP)    ............................. 2006-259005

(51) Int. Cl.
*F16H 59/72*    (2006.01)
(52) U.S. Cl. .................................................... 475/117
(58) Field of Classification Search ................. 475/117; 477/74, 76, 79, 98
See application file for complete search history.

(56) References Cited

U.S. PATENT DOCUMENTS

| | | | |
|---|---|---|---|
| 5,601,511 A | * | 2/1997 | Michioka ...................... 477/98 |
| 6,024,668 A | | 2/2000 | Holbrook et al. |
| 6,729,987 B2 | * | 5/2004 | Sakamoto et al. ........... 475/117 |

FOREIGN PATENT DOCUMENTS

JP    2006-183705 A    7/2006

* cited by examiner

*Primary Examiner*—Sherry L Estremsky
*Assistant Examiner*—Edwin A. Young
(74) *Attorney, Agent, or Firm*—Foley & Lardner LLP

(57) ABSTRACT

In system and method of controlling an automatic transmission that includes a lowest gear-stage friction element and has a lowest gear stage having a largest gear ratio and a gear stage other than the lowest gear stage, the lowest gear stage being established through engagement of the lowest gear-stage friction element, the gear stage other than the lowest gear stage being established while the lowest gear-stage friction element is kept in disengagement, a temperature of working oil in the automatic transmission is sensed, and use of the lowest gear stage is inhibited and use of the gear stage other than the lowest gear stage is allowed when the sensed temperature of the working oil is lower than a first predetermined temperature as a predetermined extremely low temperature at which an engagement failure of the lowest gear-stage friction element is caused.

20 Claims, 8 Drawing Sheets

FIG.2

|      | LOW/C | 3-5R/C | H/C | L&R/B | 2-6/B | LOW/OWC |
|------|-------|--------|-----|-------|-------|---------|
| 1ST  | ○     |        |     | ⊗     |       | ◉       |
| 2ND  | ○     |        |     |       | ○     |         |
| 3RD  | ○     | ○      |     |       |       |         |
| 4TH  | ○     |        | ○   |       |       |         |
| 5TH  |       | ○      | ○   |       |       |         |
| 6TH  |       |        | ○   |       | ○     |         |
| REV  |       | ○      |     | ○     |       |         |

⊗: ENGINE BRAKE, MANUAL MODE RUNNING

SYSTEM AND METHOD OF CONTROLLING AUTOMATIC TRANSMISSION

BACKGROUND OF THE INVENTION

The present invention relates to a system and method of controlling an automatic transmission under a low temperature condition of a working oil in the automatic transmission.

A conventional multiple-speed automatic transmission includes a planetary gear set and a plurality of friction elements such as a clutch and a brake and performs a plurality of gear speeds by changing a combination of engagement and disengagement of the friction elements. For instance, there has been proposed an automatic transmission capable of performing a lowest gear stage which has a largest gear ratio by engaging a one-way clutch. However, if the one-way clutch is a roller one-way clutch, a vehicle could not be started even when a select lever is shifted from neutral "N" position or reverse "R" position to drive "D" position under a condition that a temperature of a working oil in the automatic transmission is low. This is because when the working oil temperature is low, an oil film formed between a roller and an inner race of the roller one-way clutch has large shear resistance to thereby prevent the roller from shearing the oil film and coming into metal-to-metal contact with the inner race. As a result, the roller one-way clutch fails to be engaged.

Japanese Patent Application First Publication No. 2006-183705 discloses an automatic transmission which contemplates avoiding occurrence of the above-described failure of starting of the vehicle at low temperatures of a working oil by engaging a brake which is disposed parallel to a roller one-way clutch.

SUMMARY OF THE INVENTION

The brake disposed parallel to the roller one-way clutch is a friction element that is engaged when engine brake at low gear stage is applied, and during manual mode running and rearward running. Therefore, a torque capacity of the brake must be increased so as to transmit a large torque. Two manners of increasing the torque capacity of the brake are: (1) increasing the number of friction plates which form the brake; and (2) increasing an area of a cross section of a piston that presses against the friction plates, i.e., an area of a pressure-applying surface of a piston chamber to which a pressure is applied. The former of the two manners causes an increase in axial length of the transmission, and therefore, there is a tendency of adopting the latter of the two manners.

However, if the torque capacity of the brake is increased in the latter of the two manners, there will occur an increase in the amount of the working oil which is required for engaging the brake. Therefore, when a temperature of the working oil is too low to allow the one-way clutch to be engaged, supply of the working oil to the brake is delayed due to deterioration in flowability of the working oil. This causes slippage in the brake. Thus, in the conventional art as described above, failure upon starting of the vehicle would be still unavoidable.

Further, the above-described problem will occur not only at the start of the vehicle but also when a changeover from the gear stage other than the lowest gear stage to the lowest gear stage has attempted during the vehicle running at a low temperature of the working oil. In this case, a motive power from the engine cannot be transmitted so that the driving force demanded by the vehicle driver cannot be obtained.

The present invention has been made in view of the above-described problems. It is an object of the present invention to provide a system and method of controlling an automatic transmission which is capable of improving starting and drivability of the vehicle under a condition of low temperatures of a working oil in the automatic transmission.

In one aspect of the present invention, there is provided a system for controlling an automatic transmission, the automatic transmission comprising a plurality of friction elements which come into engagement upon being supplied with a working oil and include a lowest gear-stage friction element, the automatic transmission having a lowest gear stage that has a largest gear ratio and a gear stage other than the lowest gear stage, the lowest gear stage being established through engagement of the lowest gear-stage friction element, the gear stage other than the lowest gear stage being established while the lowest gear-stage friction element is kept in disengagement, the system comprising:

a sensor that senses a temperature of the working oil in the automatic transmission; and an electronic control unit operative depending on the sensed temperature, the electronic control unit being programmed to:

inhibit use of the lowest gear stage and allow use of the gear stage other than the lowest gear stage when the sensed temperature of the working oil is lower than a first predetermined temperature as a predetermined extremely low temperature at which an engagement failure of the lowest gear-stage friction element is caused.

In a further aspect of the present invention, there is provided an automatic transmission having a lowest gear stage that has a largest gear ratio and a gear stage other than the lowest gear stage, the automatic transmission comprising:

a plurality of friction elements which come into engagement upon being supplied with a working oil, the plurality of friction elements including a lowest gear-stage friction element that is in engagement when the lowest gear stage is established;

a sensor that senses a temperature of the working oil in the automatic transmission; and an electronic control unit operative depending on the sensed temperature, the electronic control unit being programmed to:

inhibit use of the lowest gear stage and allow use of the gear stage other than the lowest gear stage when the sensed temperature of the working oil is lower than a first predetermined temperature as a predetermined extremely low temperature at which an engagement failure of the lowest gear-stage friction element is caused, the gear stage other than the lowest gear stage being established while the lowest gear-stage friction element is kept in disengagement.

In a still further aspect of the present invention, there is provided a method of controlling an automatic transmission, the automatic transmission comprising a plurality of friction elements which come into engagement upon being supplied with a working oil and include a lowest gear-stage friction element, the automatic transmission having a lowest gear stage that has a largest gear ratio and a gear stage other than the lowest gear stage, the lowest gear stage being established through engagement of the lowest gear-stage friction element, the gear stage other than the lowest gear stage being established while the lowest gear-stage friction element is kept in disengagement, the method comprising the steps of:

sensing a temperature of the working oil in the automatic transmission; and inhibiting use of the lowest gear stage and allowing use of the gear stage other than the lowest gear stage when the sensed temperature of the working oil is lower than a first predetermined temperature as a predetermined extremely low temperature at which an engagement failure of the lowest gear-stage friction element is caused.

BRIEF DESCRIPTION OF THE DRAWINGS

FIG. 2 is a diagram showing a combination of engagement of friction elements in the automatic transmission shown in FIG. 1.

DETAILED DESCRIPTION OF THE INVENTION

Figure 1:
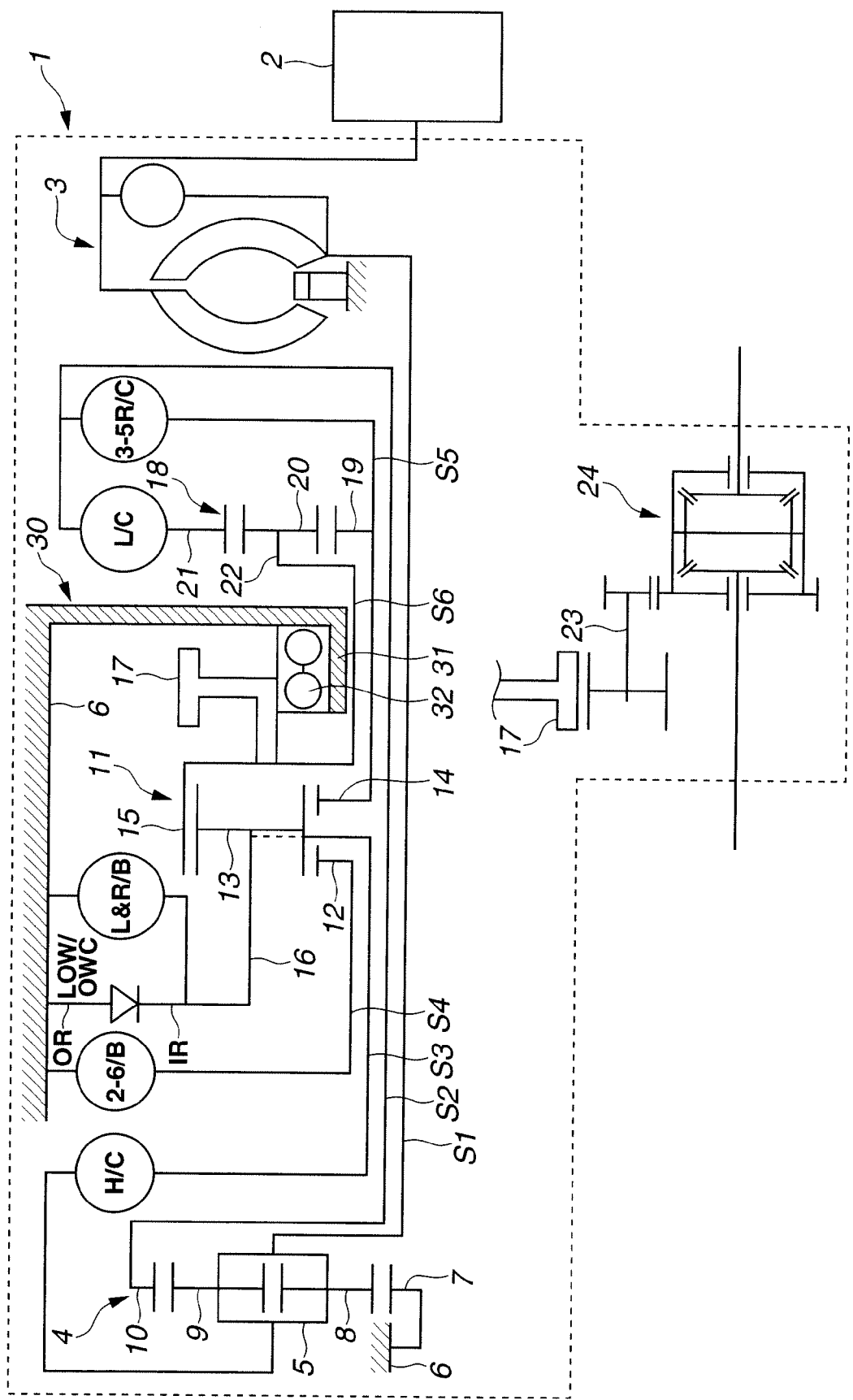
FIG. 1 is a skeleton diagram showing a gear train of an automatic transmission to which a system and method of an embodiment of the present invention is applicable.

Referring to FIGS. 1-8, an embodiment of a system and method for controlling an automatic transmission, according to the present invention is explained. FIG. 1 is a skeleton diagram showing a gear train of the automatic transmission to which the system and method of the embodiment is applicable. The gear train has six forward gears and one reverse gear.

As shown in FIG. 1, automatic transmission 1 includes torque converter 3 that is coupled to engine 2. A motive power of engine 2 is inputted to torque converter 3 and then to carrier 5 of double-pinion planetary gearset 4 via rotation shaft S1. Double-pinion planetary gearset 4 includes sun gear 7 fixed to transmission casing 6, inner pinion 8 meshing with sun gear 7, outer pinion 9 meshing with inner pinion 8, ring gear 10 meshing with outer pinion 9 and disposed coaxially with sun gear 7, and carrier 5 supporting inner pinion 8 and outer pinion 9. Ring gear 10 is coupled to rotation shaft S2 that extends over an outer circumferential surface of rotation shaft S1 toward engine 2 through an inside of output gear 17. Carrier 5 is coupled to rotation shaft 3 that extends over an outer circumferential surface of rotation shaft S2 toward engine 2, through high clutch H/C.

Rotation shaft 3 has an end coupled to high clutch H/C and an opposite end coupled to carrier 16 of single-pinion planetary gearset 11 which supports pinion 13. Carrier 16 is coupled to transmission casing 6 through low and reverse brake L&R/B and low one-way clutch LOW/OWC which are disposed in parallel. Low one-way clutch LOW/OWC is a roller one-way clutch that includes inner race IR coupled to carrier 16, outer race OR fixed to transmission casing 6, and a plurality of rollers between inner race IR and outer race OR. With this construction, carrier 16 is supported on transmission casing 6 so as to be rotatable in one direction and can be restrained from rotating and be released from the restraint, namely, carrier 16 is fixable and releasable with respect to transmission casing 6.

Single-pinion planetary gearset 11 further includes second sun gear 14 disposed on a side of engine 2, first sun gear 12 disposed opposite to second sun gear 14, and ring gear 15. Pinion 13 meshes with first sun gear 12, second sun gear 14 and ring gear 15. First sun gear 12 is coupled to rotation shaft S4 that extends over an outer circumferential surface of rotation shaft S3 in a direction opposite to engine 2. Rotation shaft S4 is coupled to transmission casing 6 through 2-6 brake 2-6/B to thereby be fixable and releasable with respect to transmission casing 6 through 2-6 brake 2-6/B. Second sun gear 14 is coupled to rotation shaft S5 that extends toward engine 2 through an inside of output gear 17 and over an outer circumferential surface of rotation shaft S2. Rotation shaft S5 is coupled to rotation shaft S2 through 3-5 reverse clutch 3-5R/C and coupled to ring gear 21 of single-pinion planetary gearset 18 through low clutch LOW/C that serves as an upstream friction element.

Single-pinion planetary gearset 18 is disposed between output gear 17 and 3-5 reverse clutch 3-5R/C on a radial outside of rotation shaft S5. Single-pinion planetary gearset 18 includes sun gear 19, ring gear 21, pinion 20 and carrier 22. Sun gear 19 is coupled to rotation shaft S5. Ring gear 21 is disposed on a radial outside of sun gear 19. Pinion 20 meshes with sun gear 19 and ring gear 21 and is supported by carrier 22. Carrier 22 is coupled to ring gear 15 of single-pinion planetary gearset 11 through rotation shaft S6 that extends over an outer circumferential surface of rotation shaft S5 and through the inside of output gear 17.

Bearing support 30 is disposed between single-pinion planetary gearsets 11 and 18. Bearing support 30 is a bulkhead-shaped member and integrally formed with transmission casing 6. Bearing support 30 includes a cylindrical support portion 31 that extends along rotation shaft S6. Bearing 32 is fitted to an outer circumferential surface of support portion 31. Output gear 17 that is coupled to ring gear 15 is in contact with an outer race of bearing 32. Rotation shafts S1, S2, S5 and S6 are arranged inside support portion 31 in a coaxial relation to each other and cooperate to form a multi-layered construction.

Thus-constructed automatic transmission 1 has multiple gear stages which include six forward speeds 1ST-6TH and one reverse REV. When a shift lever is in a D-range position, automatic transmission 1 performs automatic shift control in which one of the six forward speeds 1ST-6TH is selected and set as a target gear stage in accordance with a predetermined shift map and an operating point that is determined on the basis of vehicle speed and throttle opening degree. When the shift lever is in the R-range position, automatic transmission 1 performs shift control in which the one reverse REV is set as the target gear stage.

The respective gear stages are established by combination of engagement and disengagement (release) of the friction elements of high clutch H/C, 2-6 brake 2-6/B, low and reverse brake L&R/B (low one-way clutch LOW/OWC), low clutch LOW/C and 3-5 reverse clutch 3-5R/C. The output rotation speed of engine 2 is changed depending on a gear ratio at the respective gear stages and transmitted to a drive wheel, not shown, through output gear 17, countershaft 23 and differential gear 24.

FIG. 2 shows a relationship between each of the gear stages and the engagement and disengagement (release) of each of the friction elements. In FIG. 2, a cell with circle denotes engagement, a cell with no sign denotes release, a cell with cross in circle denotes engagement during engine braking or manual mode running, and a hatched cell denotes mechanical engagement during engine driving.

First speed 1ST as a lowest gear stage having a largest gear ratio among the gear stages of automatic transmission 1 is established through engagement of low clutch LOW/C as the upstream friction element and engagement of one of low and reverse brake L&R/B and low one-way clutch LOW/OWC which serves as a lowest gear-stage friction element. In the D-range position, rotation of an input shaft, namely, rotation shaft S1, which is reduced through double-pinion planetary gearset 4 is inputted to carrier 22 through rotation shaft S2, low clutch LOW/C and ring gear 21 of single-pinion planetary gearset 18. The rotation inputted to carrier 22 is transmitted to ring gear 15 of single-pinion planetary gearset 11 through rotation shaft S6. The rotation of ring gear 15 is reduced due to a reaction from carrier 16 that is fixed to transmission casing 6 upon engagement of low one-way clutch LOW/OWC. Then, reduced rotation at the maximum reduction ratio is outputted from output gear 17. During engine braking and manual mode running, low and reverse brake L&R/B is in engagement and receives a reaction in place of low one-way clutch LOW/OWC which is in idle.

Second speed 2ND is established through engagement of low clutch LOW/C and 2-6 brake 2-6/B. At second speed 2ND, rotation of rotation shaft S1 which is reduced through double-pinion planetary gearset 4 is inputted to carrier 22 through rotation shaft S2, low clutch LOW/C and ring gear 21 of single-pinion planetary gearset 18. On the other hand, first sun gear 12 and pinion 13 are fixed with respect to transmission casing 6 through engagement of 2-6 brake 2-6/B. Further, through meshing engagement of pinion 13 and second sun gear 14, rotation shaft S5 coupled to second sun gear 14 is fixed with respect to transmission casing 6.

Third speed 3RD is established through engagement of low clutch LOW/C and 3-5 reverse clutch 3-5R/C. Fourth speed 4TH is established through engagement of low clutch LOW/C and high clutch H/C. Fifth speed 5TH is established through engagement of 3-5 reverse clutch 3-5R/C and high clutch H/C. Sixth speed 6TH is established through engagement of high clutch H/C and 2-6 brake 2-6/B. Similar to second speed 2ND, rotation shaft S5 is fixed with respect to transmission casing 6 through engagement of 2-6 brake 2-6/B.

Reverse REV is established through engagement of 3-5 reverse clutch 3-5R/C and low and reverse brake L&R/B.

Figure 3:
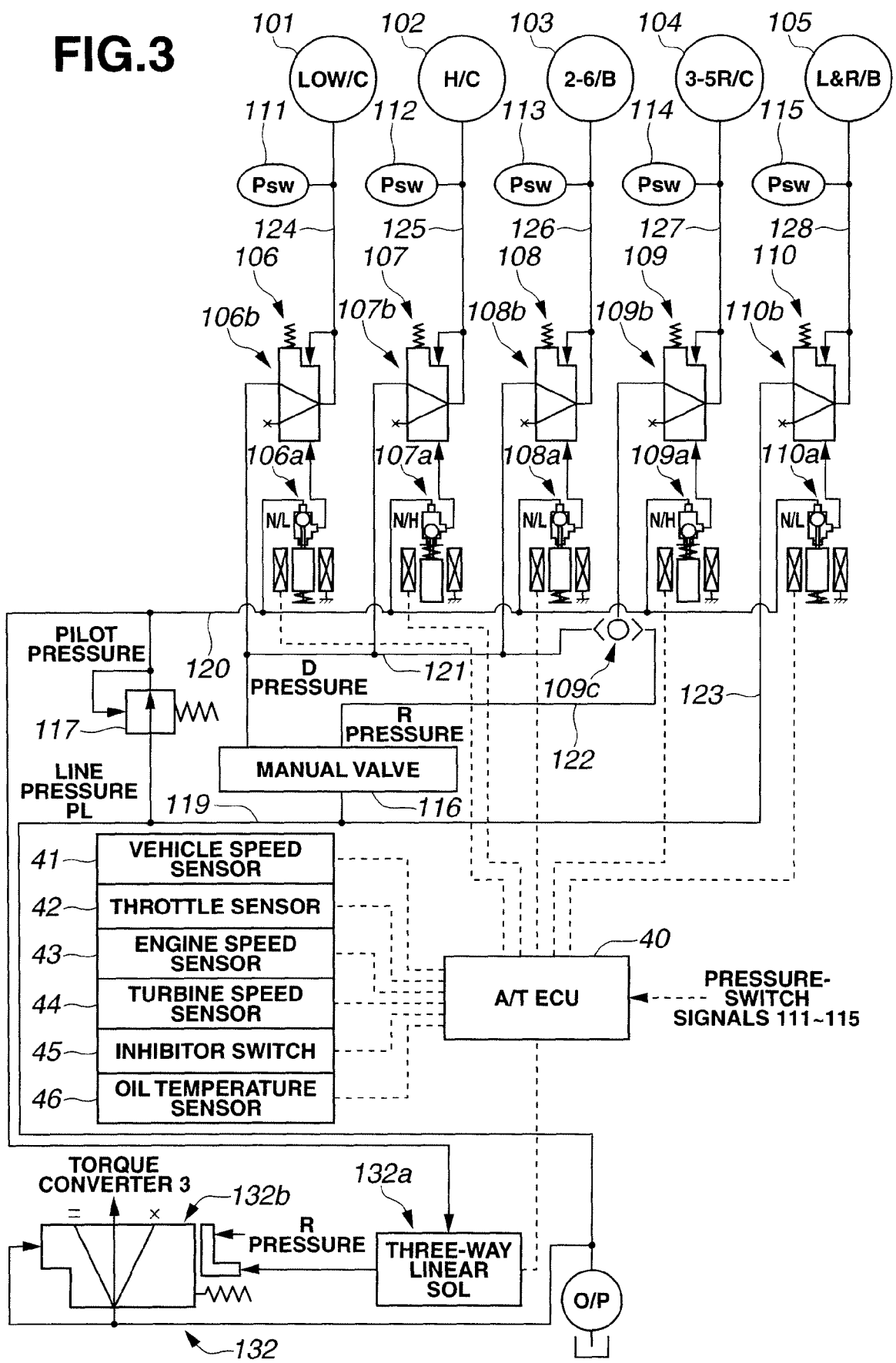
FIG. 3 is a diagram showing a hydraulic circuit and an electronic shift-control system in the embodiment.

Next, a hydraulic circuit and an electronic shift-control system for achieving the above shift control in automatic transmission 1 are explained by referring to FIG. 3. Referring to FIG. 3, there are shown engagement piston chamber 101 of low clutch LOW/C, engagement piston chamber 102 of high clutch H/C, engagement piston chamber 103 of 2-6 brake 2-6/B, engagement piston chamber 104 of 3-5 reverse clutch 3-5R/C, and engagement piston chamber 105 of low and reverse brake L&R/B.

Low clutch LOW/C, high clutch H/C, 2-6 brake 2-6/B, 3-5 reverse clutch 3-5R/C, and low and reverse brake L&R/B are engaged by supplying engagement pressure, i.e., line pressure PL, D-range pressure or R-range pressure, to engagement piston chambers 101-105, and are released by relieving the engagement pressure therefrom.

The D-range pressure is line pressure PL that is obtained through manual valve 116, and is produced only when selecting the D range. The R-range pressure is line pressure PL that is obtained through the manual valve 116, and is produced only when selecting the R range. In the other ranges than the R range, no pressure is produced by changeover to a drain port.

As illustrated in FIG. 3, the hydraulic circuit includes first hydraulic control valve 106, second hydraulic control valve 107, third hydraulic control valve 108, fourth hydraulic control valve 109, fifth hydraulic control valve 110 and line pressure control valve 132. First hydraulic control valve 106 controls the engagement pressure (low-clutch pressure) applied to engagement piston chamber 101 of low clutch LOW/C. Second hydraulic control valve 107 controls the engagement pressure (high-clutch pressure) applied to engagement piston chamber 102 of high clutch H/C. Third hydraulic control valve 108 controls the engagement pressure (2-6 brake pressure) applied to engagement piston chamber 103 of 2-6 brake 2-6/B. Fourth hydraulic control valve 109 controls the engagement pressure (3-5 reverse-clutch pressure) applied to engagement piston chamber 104 of 3-5 reverse clutch 3-5R/C. Fifth hydraulic control valve 110 controls the engagement pressure (low and reverse brake pressure) applied to engagement piston chamber 105 of low and reverse brake L&R/B. Line pressure control valve 132 controls line pressure PL.

First hydraulic control valve 106 includes first duty solenoid 106a and first pressure regulator valve 106b. First duty solenoid 106a produces a solenoid pressure with the pilot pressure as source pressure. First pressure regulator valve 106b regulates the low-clutch pressure with the D-range pressure in response to the solenoid pressure as operation signal pressure which is outputted from first duty solenoid 106a. The low-clutch pressure serves as feedback pressure which is applied to first pressure regulator valve 106b. First duty solenoid 106a is controlled in accordance with the duty ratio in such a manner as to bring the low-clutch pressure to zero when the solenoid is turned off, and increase the low-clutch pressure with an increase in the ON duty ratio when the solenoid is turned on.

Second hydraulic control valve 107 includes second duty solenoid 107a and second pressure regulator valve 107b. Second duty solenoid 107a produces a solenoid pressure with the pilot pressure as source pressure. Second pressure regulator valve 107b regulates the high-clutch pressure with the D-range pressure in response to the solenoid pressure as operation signal pressure which is outputted from second duty solenoid 107a. The high-clutch pressure serves as feedback pressure that is applied to second pressure regulator valve 107b. Second duty solenoid 107a is controlled in such a manner as to bring the high-clutch pressure to zero when the solenoid is turned on (100% ON duty ratio), increase the high-clutch pressure with a decrease in the ON duty ratio, and bring the high-clutch pressure to the maximum pressure when the solenoid is turned off.

Third hydraulic control valve 108 includes third duty solenoid 108a and third pressure regulator valve 108b. Third duty solenoid 108a produces a solenoid pressure with the pilot pressure as source pressure. Third pressure regulator valve 108b regulates the 2-6 brake pressure with the D-range pressure in response to the solenoid pressure as operation signal pressure which is outputted form third duty solenoid 108a. The 2-6 brake pressure serves as feedback pressure that is applied to third pressure regulator valve 108b. Third duty solenoid 108a is controlled in such a manner as to bring the 2-6 brake pressure to zero when the solenoid is turned off, and increase the 2-6 brake pressure with an increase in the ON duty ratio when the solenoid is turned on.

Fourth hydraulic control valve 109 includes fourth duty solenoid 109a and fourth pressure regulator valve 109b. Fourth duty solenoid 109a produces a solenoid pressure with the pilot pressure as source pressure. Fourth pressure regulator valve 109b regulates the 3-5 reverse-clutch pressure with the D-range pressure in response to the solenoid pressure as operation signal pressure which is outputted from fourth duty solenoid 109a when the D range is selected. The 3-5 reverse-clutch pressure serves as feedback pressure that is applied to fourth pressure regulator valve 109b. Fourth pressure regulator valve 109b also regulates the 3-5 reverse-clutch pressure with the R-range pressure in response to the solenoid pressure as operation signal pressure which is outputted from fourth duty solenoid 109a when the R-range is selected. Fourth duty solenoid 109a is controlled in such a manner as to bring the 3-5 reverse-clutch pressure to zero when the solenoid is turned on (100% ON duty ratio), increase the 3-5 reverse-clutch pressure with a decrease in the ON duty ratio, and bring the 3-5 reverse-clutch pressure to the maximum pressure when the solenoid is turned off. Two-way selector shuttle ball valve 109c is provided in a hydraulic passage that is communicated with fourth hydraulic control valve 109. Shuttle ball valve 109c carries out changeover between the D-range pressure output to fourth hydraulic control valve 109 and the R-range pressure output to fourth hydraulic control valve 109.

Fifth hydraulic control valve 110 includes fifth duty solenoid 110a and fifth pressure regulator valve 110b. Fifth duty solenoid 110a produces a solenoid pressure with the pilot pressure as source pressure. Fifth pressure regulator valve 110b regulates the low and reverse brake pressure with the line pressure in response to the solenoid pressure as operation signal pressure which is outputted from fifth duty solenoid 110a. The low and reverse brake pressure serves as feedback pressure that is applied to fifth pressure regulator valve 110b. Fifth duty solenoid 110a is controlled in such a manner as to bring the low and reverse brake pressure to zero when the solenoid is turned off, and increase the low and reverse brake pressure with an increase in the ON duty ratio when the solenoid is turned on.

Line pressure control valve 132 includes linear solenoid 132a and line pressure regulator valve 132b. Linear solenoid 132a is a three-way servo solenoid valve that produces a solenoid pressure with the pilot pressure as source pressure. Line pressure regulator valve 132b regulates line pressure PL by draining a discharge pressure from oil pump O/P in response to the solenoid pressure as operation signal pressure which is outputted from linear solenoid 132a. Line pressure PL serves as feedback pressure which is applied to line pressure control valve 132. Linear solenoid 132a is controlled in such a manner as to bring line pressure PL to the maximum pressure when an electric current flow is cut off, and decrease line pressure PL with an increase in the electric current flow. The working oil drained from line pressure regulator valve 132b is outputted to torque converter 3 and serves as converter pressure, and then is drained from torque converter 3 and returned to an inlet port of oil pump O/P.

In FIG. 3, reference numerals 111-115 denote first to fifth hydraulic pressure switches, and reference numerals 116-117 denote a manual valve and a pilot valve, respectively. Reference numerals 119 and 120 denote a line pressure passage and a pilot pressure passage, respectively. Further, reference numerals 121, 122, 124, 125, 126, 127 and 128 denote a D-range hydraulic pressure passage, a R-range hydraulic pressure passage, a low-clutch hydraulic pressure passage, a high-clutch hydraulic pressure passage, a 2-6 brake hydraulic pressure passage, a 3-5 reverse-clutch hydraulic pressure passage, and a low and reverse brake hydraulic pressure passage, respectively.

First hydraulic pressure switch 111 is disposed in low-clutch hydraulic pressure passage 124 through which first hydraulic control valve 106 and engagement piston chamber 101 are connected with each other. Second hydraulic pressure switch 112 is disposed in high-clutch hydraulic pressure passage 25 through which second hydraulic control valve 107 and engagement piston chamber 102 are connected with each other. Third hydraulic pressure switch 113 is disposed in 2-6 brake hydraulic pressure passage through which third hydraulic control valve 108 and engagement piston chamber 103 are connected with each other. Fourth hydraulic pressure switch 114 is disposed in 3-5 reverse-clutch hydraulic pressure passage 127 through which fourth hydraulic control valve 109 and engagement piston chamber 104 are connected with each other. Fifth hydraulic pressure switch 105 is disposed in low and reverse brake hydraulic pressure passage 128 through which fifth hydraulic control valve 110 and engagement piston chamber 105 are connected with each other. First to fifth hydraulic pressure switches 111-115 respectively sense the presence of the engagement pressure in hydraulic pressure passages 124 to 128 and generate ON signal when the engagement pressure is present, and OFF signal when the engagement pressure is not present.

The electronic shift control system includes automatic transmission (A/T) electronic control unit (ECU) 40, vehicle speed sensor 41 that senses vehicle speed V, throttle sensor 42 that senses throttle opening degree, engine speed sensor 43 that senses rotational speed of engine 2, turbine speed sensor 44 that senses turbine rotational speed of torque converter 3, inhibitor switch 45 that senses a position of the select lever, and oil temperature sensor 46 that senses a temperature $T_{ATF}$ of the working oil in an oil pan of automatic transmission 1. A/T ECU 40 receives signals generated from sensors and switches 41-46 and 111-115 and carries out computing on the basis of the signals from sensors and switches 41-46 and 111-115 and a preprogrammed shift control regulation and fail safe control regulation. A/T ECU 40 outputs solenoid drive signals to first to fifth duty solenoids 106a-110a and linear solenoid 132a in accordance with the results of computing.

Figure 4:
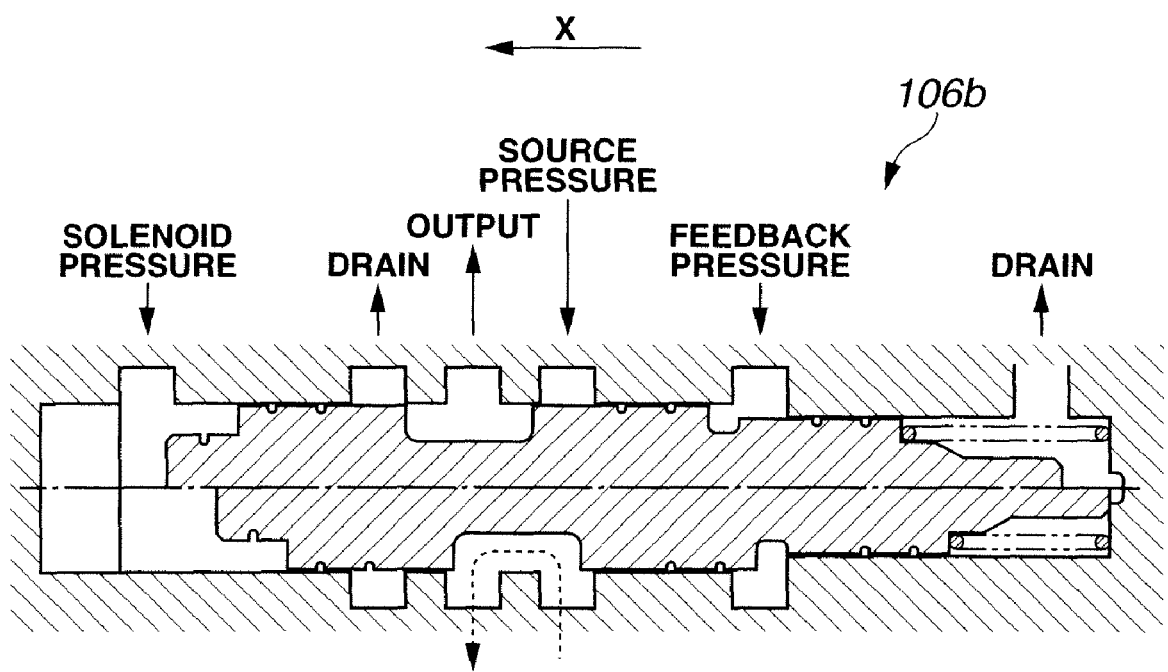
FIG. 4 is a cross section of a first pressure regulator valve, taken in an axial direction of the first pressure regulator valve.
Figure 5:
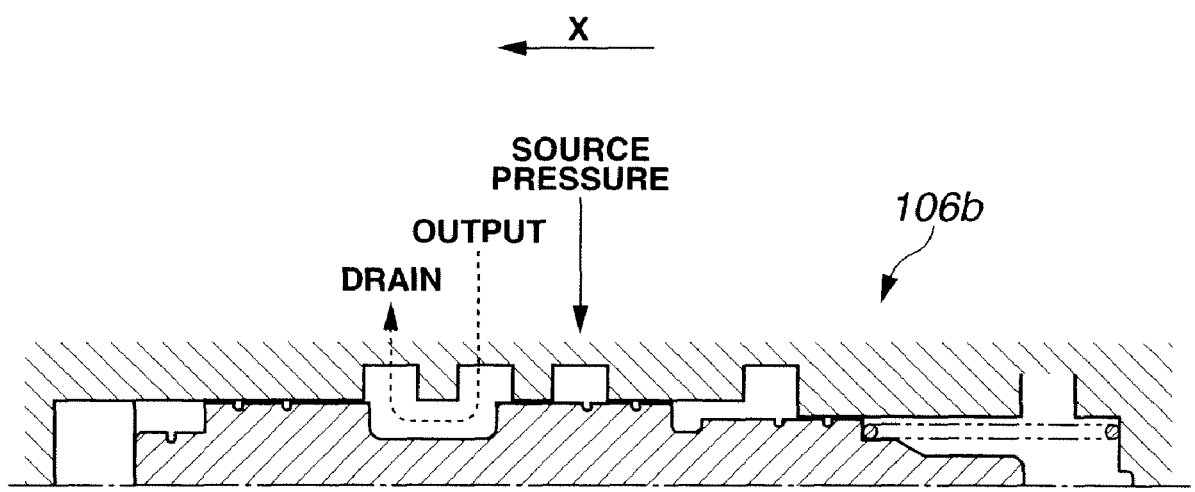
FIG. 5 is a view similar to FIG. 4 but shows a spool of the first pressure regulator valve which is in a position different from that of the spool as shown in FIG. 4.

Referring to FIGS. 4 and 5, the construction of each of first to fifth pressure regulator valves 106b-110b is explained. FIGS. 4 and 5 show a cross section of first pressure regulator valve 106b, taken in an axial direction of a spool of first pressure regulator valve 106b. Basically, first pressure regulator valve 106b controls the engagement pressure to a target hydraulic pressure by regulating a ratio between an amount of the working oil inflow that is directed from a source pressure port to an output port and an amount of the working oil outflow that is directed from the output port to a drain port. First pressure regulator valve 106b is configured such that a maximum value of the engagement pressure that is outputted from the output port and a maximum value of line pressure PL that is inputted from the source pressure port are equal to each other.

As shown in FIGS. 4 and 5, when an axial end of the spool of first pressure regulator valve 106b to which a spring is mounted is defined as a negative side in the axial direction X of the spool, solenoid pressure port, drain port, output (low-clutch pressure) port, source pressure (line pressure) port, and output feedback pressure port are successively provided from a positive side in the axial direction X in turn.

When the solenoid pressure as operation signal pressure from first duty solenoid 106a is applied to the spool of first pressure regulator valve 106b, the spool is biased toward the negative side in the axial direction X. In contrast, when the feedback pressure is applied to the spool of first pressure regulator valve 106b, the spool is biased toward the positive side in the axial direction X via low-clutch hydraulic pressure passage 124. By adjusting the balance between the force biasing the spool toward the negative side and the force biasing the spool toward the positive side, fluid communication between the source pressure port and the output port and fluid communication between the output port and the drain port are controlled such that the engagement pressure can be controlled to the target hydraulic pressure.

When the solenoid of first duty solenoid 106a is turned on, the solenoid pressure as operation signal pressure becomes a maximum pressure. For instance, when the maximum solenoid pressure as the operation signal pressure is outputted and line pressure PL is lower than the hydraulic pressure (the maximum value of the engagement pressure) corresponding to the maximum solenoid pressure, the spool of first pressure regulator valve 106b is displaced toward the negative side in the axial direction X to a maximum extent and placed in a position shown in a lower half of the cross section of FIG. 4. In this position, the source pressure port and the output port are communicated with each other and the source pressure port has a largest opening degree. Therefore, the output pressure, i.e., the low-clutch pressure, becomes a maximum and equal to the source pressure, i.e., line pressure PL.

In contrast, when the solenoid of first duty solenoid 106a is turned off, the solenoid pressure becomes a minimum pressure. At this time, the spool of first pressure regulator valve 106b is displaced toward the positive side in the axial direction X to a maximum extent and placed in a position shown in FIG. 5. In this position, the output port and the drain port are communicated with each other and the drain port has a largest opening degree. Therefore, the output pressure, i.e., the low-clutch pressure, becomes a minimum, i.e., zero.

Second to fifth pressure regulator valves 107b-110b have substantially the same structure as that of first pressure regulator valve 106b, and therefore, detailed explanations therefor are omitted.

Next, the shift control that is conducted by A/T ECU 40 under a condition that a temperature of the working oil in automatic transmission 1 is low, is explained. The shift control will be hereinafter referred to as low-temperature shift control.

Automatic transmission 1 achieves first speed 1ST through engagement of low clutch LOW/C and engagement of one of low and reverse brake L&R/B and low one-way clutch LOW/OWC which serves as the lowest gear-stage friction element.

However, when working oil temperature $T_{AFT}$ is lower than predetermined extremely low temperature $T_2$, viscosity of the working oil is considerably high and shear resistance of an oil film between the roller and inner race IR of low one-way clutch LOW/OWC is large. Therefore, even if first speed 1ST is aimed at the target gear stage under such the low temperature condition of the working oil, the roller would fail to shear the oil film and come into metal-to-metal contact with inner race IR, which results in slippage in low one-way clutch LOW/OWC. Further, even if first speed 1ST is aimed at the target gear stage through engagement of low and reverse brake L&R/B that is arranged parallel to low one-way clutch LOW/OWC, in place of engagement of low one-way clutch LOW/OWC during engine braking, manual mode running or the like in the same low temperature condition of the working oil, supply of the working oil to low and reverse brake L&R/B would be delayed to thereby cause slippage in low and reverse brake L&R/B.

Further, if inhibitor switch 45 is in an abnormal state, the current position of the select lever cannot be determined. Therefore, in such a case, the shift control is carried out by estimating the current position of the select lever. Upon engaging the friction element in the shift control, fail-safe control is performed in order to prevent delay in engagement of the friction elements. Specifically, the fail-safe control is conducted by increasing a rate of increase in the hydraulic pressure to be supplied, namely, an engagement speed, as compared to that in a normal condition so as to supply the maximum hydraulic pressure from an initial stage of engagement of the friction elements.

Accordingly, when the select lever is shifted from the N-range position or the R-range position to the D-range position and first speed 1ST is aimed at the target gear stage under a condition that inhibitor switch 45 is in the abnormal state, the hydraulic pressure to be supplied to low clutch LOW/C is increased to a maximum pressure from the beginning of starting the engagement operation. That is, the solenoid of first duty solenoid 106a is turned on and the solenoid pressure as operation signal pressure becomes the maximum pressure. Then, the spool of first pressure regulator valve 106b is placed in the position in which the source pressure port and the output port are communicated with each other so that the low-clutch pressure becomes the maximum. As a result, low clutch LOW/C is abruptly engaged so that the rotation of engine 2 is rapidly transmitted to inner race IR of low clutch LOW/C.

Thus, inner race IR is rapidly started to rotate. However, if working oil temperature $T_{AFT}$ is higher than predetermined extremely low temperature $T_2$ but viscosity of the working oil is relatively high, the roller of low one-way clutch LOW/OWC would fail to shear the oil film and coming into metal-to-metal contact with inner race IR, which results in slippage in low one-way clutch LOW/OWC. Further, even when low and reverse brake L&R/B is engaged under the same condition of working oil temperature $T_{AFT}$, timing of engagement of low and reverse brake L&R/B would be offset due to deterioration in controllability at the low temperature to thereby cause shock in low and reverse brake L&R/B.

Accordingly, A/T ECU 40 carries out the low-temperature shift control as follows. A/T ECU 40 inhibits use of first speed 1ST in either of case (1) where working oil temperature $T_{AFT}$ is lower than predetermined extremely low temperature $T_2$, and case (2) where inhibitor switch 45 is in the abnormal state and working oil temperature $T_{AFT}$ is lower than predetermined low temperature $T_1$ that is higher than predetermined extremely low temperature $T_2$. Further, A/T ECU 40 allows use of second speed 2ND that has a largest gear ratio among the gear stages which can be established while both of low and reverse brake L&R/B and low one-way clutch LOW/OWC are kept in disengagement, even when the target gear stage is set to first speed 1ST in accordance with the predetermined shift map and the operating point that is determined on the basis of vehicle speed and throttle opening degree.

Figure 6:
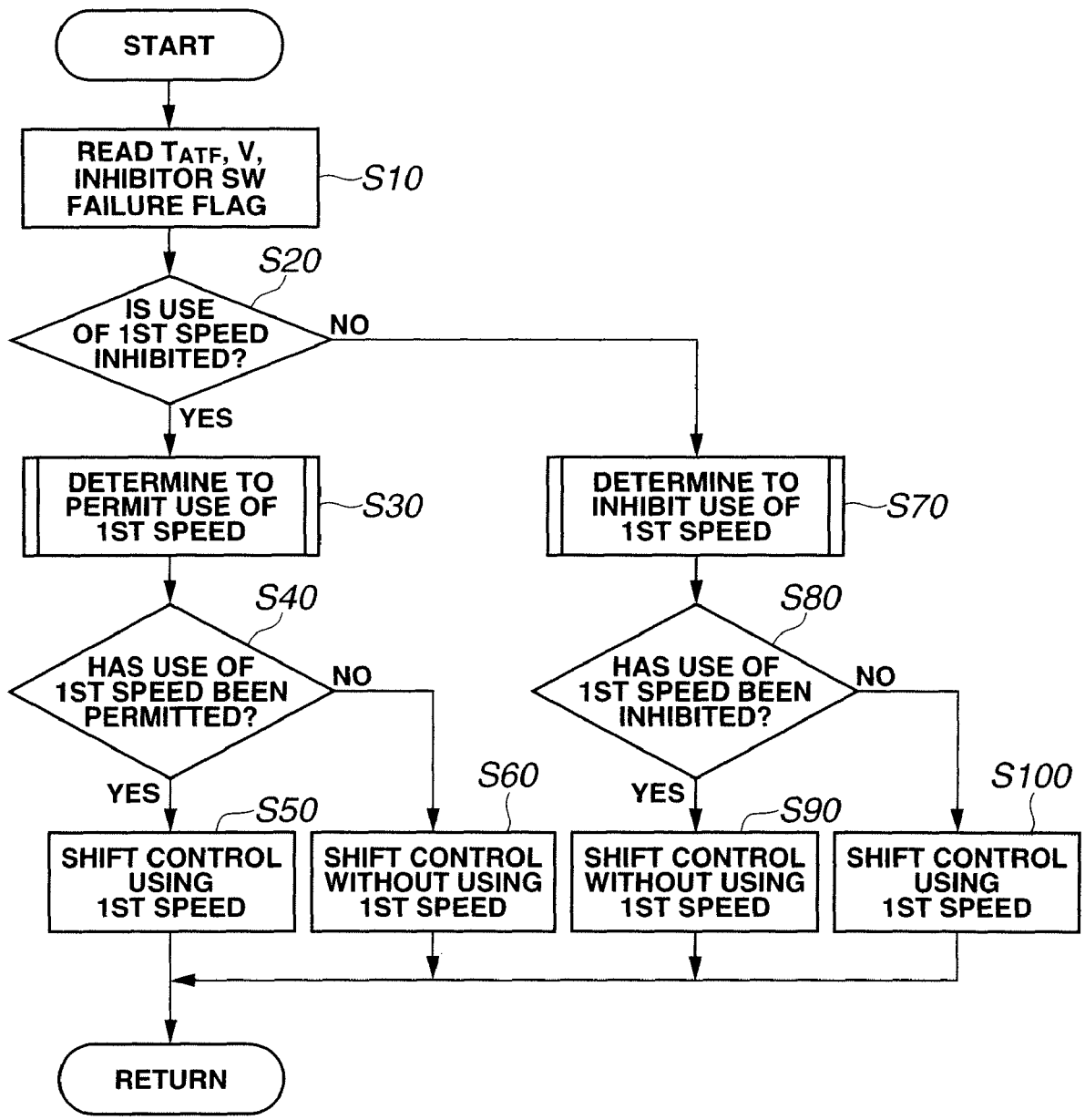
FIG. 6 is a flowchart showing a control that is carried out by an automatic transmission control unit (A/T control unit) used in the system and method of the embodiment under a condition of a low temperature of a working oil in the automatic transmission.

FIG. 6 illustrates a main flowchart of the low-temperature shift control that is executed by A/T ECU 40. The low-temperature shift control is carried out at predetermined intervals, for instance, at intervals of 50 msec.

As illustrated in FIG. 6, logic flow starts and goes to step S10 where working oil temperature $T_{AFT}$, vehicle speed V and failure flag of inhibitor switch 45 are read-in. A/T ECU 40 carries out a routine, not shown, of judgment on the abnormal state of inhibitor switch 45 on the basis of continuity of multiple switches which constitute inhibitor switch 45 and reads-in the failure flag as a result of the judgment.

The logic flow proceeds to step S20 where a determination as to whether use of first speed 1ST is inhibited is made. When the answer to step S20 is YES, indicative that use of first speed 1ST is inhibited, the logic flow proceeds to step S30. When the answer to step S20 is NO, indicative that use of first speed 1ST is permitted, the logic flow proceeds to step S70. Since the default answer of the determination is set to NO, when this routine is carried out for the first time, the logic flow proceeds to step S70.

At step S70, it is determined to inhibit use of first speed 1ST. The determination is made in accordance with a flowchart shown in FIG. 7, and will be explained later.

Subsequent to step S70, the logic flow proceeds to step S80 where a determination as to whether use of first speed 1ST has been inhibited in accordance with the determination of inhibiting use of first speed 1ST is made. When the answer to step S80 is YES, indicative that use of first speed 1ST has been inhibited, the logic flow proceeds to step S90. At step S90, the shift control without using first speed 1ST is conducted. Specifically, when the target gear stage that is set on the basis of the operating point and the shift map is the gear stage other than first speed 1ST, the gear stage other than first speed 1ST is used. On the other hand, when the target gear stage is first speed 1ST, second speed 2ND is used.

When the answer to step S80 is NO, indicative that use of first speed 1ST has been permitted, the logic flow proceeds to step S100. At step S100, the shift control is conducted so as to use the target gear stage that is set on the basis of the operating point and the shift map. When the target gear stage is first speed 1ST, first speed 1ST is used.

At step S30, it is determined to permit use of first speed 1ST. The determination is made in accordance with a flowchart shown in FIG. 8, and will be explained later.

Subsequent to step S30, the logic flow proceeds to step S40 where a determination as to whether use of first speed 1ST has been permitted in accordance with the determination of permitting use of first speed 1ST is made. When the answer to step S40 is YES, indicative that use of first speed 1ST has been permitted, the logic flow proceeds to step S50. At step S50, the shift control is conducted so as to use the target gear stage that is set on the basis of the operating point and the shift map. When the target gear stage is first speed 1ST, first speed 1ST is used.

When the answer to step S40 is NO, indicative that use of first speed 1ST has been inhibited, the logic flow proceeds to step S60. At step S60, the shift control without using first speed 1ST is conducted. Specifically, when the target gear stage that is set on the basis of the operating point and the shift map is the gear stage other than first speed 1ST, the gear stage other than first speed 1ST is used. On the other hand, when the target gear stage is first speed 1ST, second speed 2ND is used.

Accordingly, under the low-temperature shift control, when it has been determined that use of first speed 1ST is inhibited, the shift control without using first speed 1ST is carried out and second speed 2ND is used at the start of the vehicle. Further, the determination of permitting use of first speed 1ST is repetitively carried out in order to perform quick transition to the shift control using first speed 1ST and enhance drivability of the vehicle when working oil temperature $T_{AFT}$ is increased and occurrence of slippage in low and reverse brake L&R/B or low one-way clutch LOW/OWC is reduced.

In contrast, when it has been determined that use of first speed 1ST is permitted, the ordinary shift control using first speed 1ST is carried out and first speed 1ST is used at the start of the vehicle. Further, the determination of inhibiting use of first speed 1ST is repetitively carried out in order to quickly inhibit use of first speed 1ST in a case where slippage in low and reverse brake L&R/B or low one-way clutch LOW/OWC might occur again. That is, even when use of first speed 1ST is permitted, slippage in low and reverse brake L&R/B or low one-way clutch LOW/OWC might occur due to decrease in working oil temperature $T_{AFT}$ depending on change in outside air temperature or occurrence of a malfunction in inhibitor switch 45.

Figure 7:
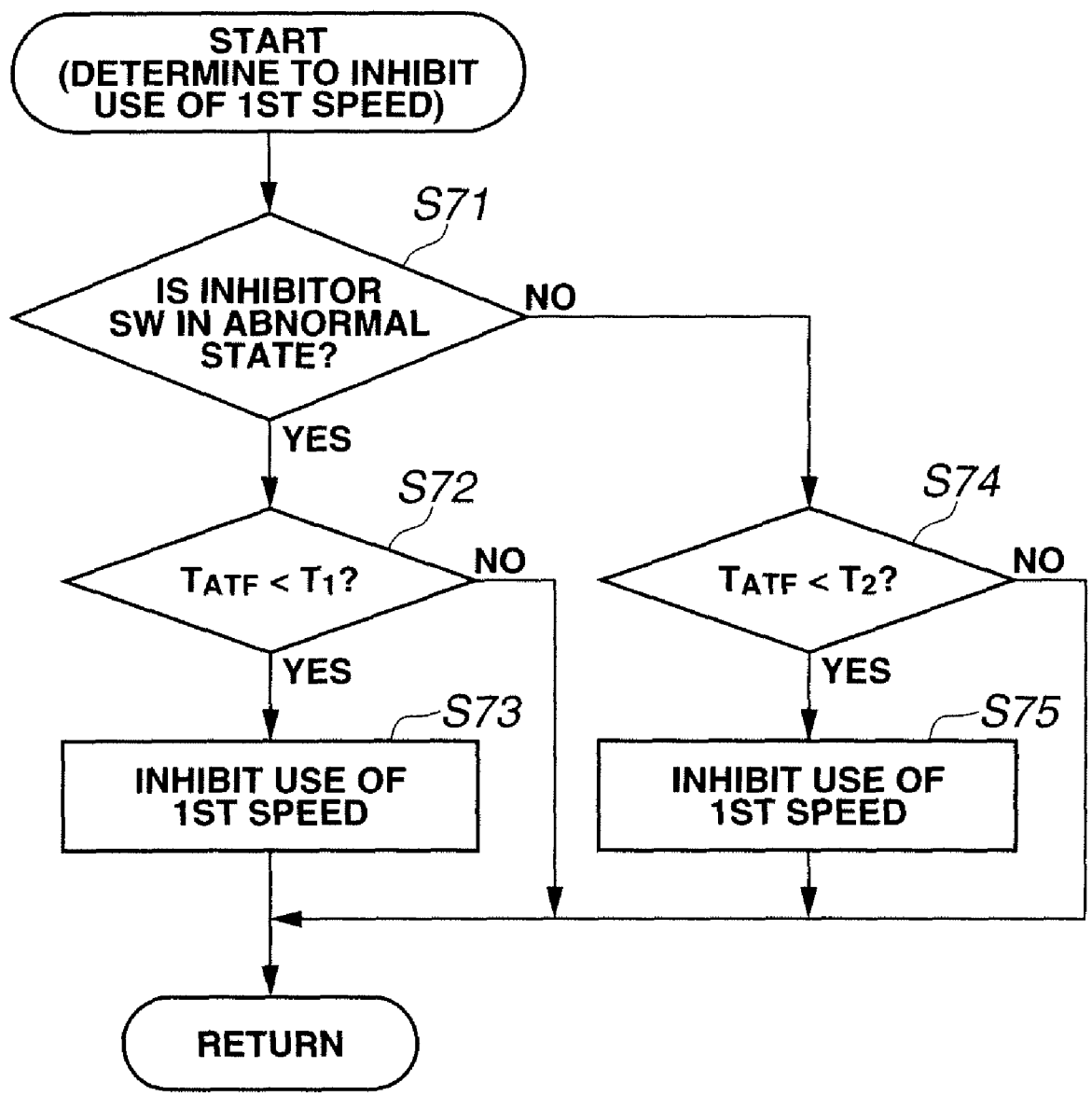
FIG. 7 is a flowchart showing details of determination of inhibiting use of a first speed which is made by the A/T control unit.

FIG. 7 illustrates the routine of the determination of inhibiting use of first speed 1ST which is carried out at step S70.

At step S71, a determination as to whether inhibitor switch 45 is in an abnormal state on the basis of the failure flag is made. When the answer to step S71 is YES, indicative that inhibitor switch 45 is in the abnormal state, the logic flow proceeds to step S72. At step S72, a determination as to whether working oil temperature $T_{AFT}$ is lower than predetermined low temperature $T_1$ is made. Predetermined low temperature $T_1$ is an upper limit value of temperature at which viscosity of the working oil is relatively high such that the roller of low one-way clutch LOW/OWC fails to shear the oil film between the roller and inner race IR and slippage in low one-way clutch LOW/OWC occurs when inner race IR rapidly rotates in a direction of engagement. For example, predetermined low temperature $T_1$ is set at −5° C. When the answer to step S72 is YES, indicative that working oil temperature $T_{AFT}$ is lower than predetermined low temperature $T_1$, the logic flow proceeds to step S73. At step S73, use of first speed 1ST is inhibited.

When the answer to step S71 is NO, indicative that inhibitor switch 45 is in an normal state, the logic flow proceeds to step S74. At step S74, a determination as to whether working oil temperature $T_{AFT}$ is lower than predetermined extremely low temperature $T_2$ is made. Predetermined extremely low temperature $T_2$ is an upper limit value of temperature at which viscosity of the working oil is considerably high such that the roller of low one-way clutch LOW/OWC fails to shear the oil film between the roller and inner race IR and slippage in low one-way clutch LOW/OWC occurs when inner race IR slowly rotates in a direction of engagement. For example, predetermined low temperature $T_2$ is set at −30° C.

Thus, in the determination of inhibiting use of first speed 1ST at step S70, when either one of the following conditions (a) and (b) is fulfilled, use of first speed 1ST is inhibited.
(a) Working oil temperature $T_{AFT}$ is lower than predetermined low temperature $T_1$, i.e., $T_{AFT}<T_1$, and inhibitor switch 45 is in the abnormal state.
(b) Working oil temperature $T_{AFT}$ is lower than predetermined extremely low temperature $T_2$, i.e., $T_{AFT}<T_2$.

Figure 8:
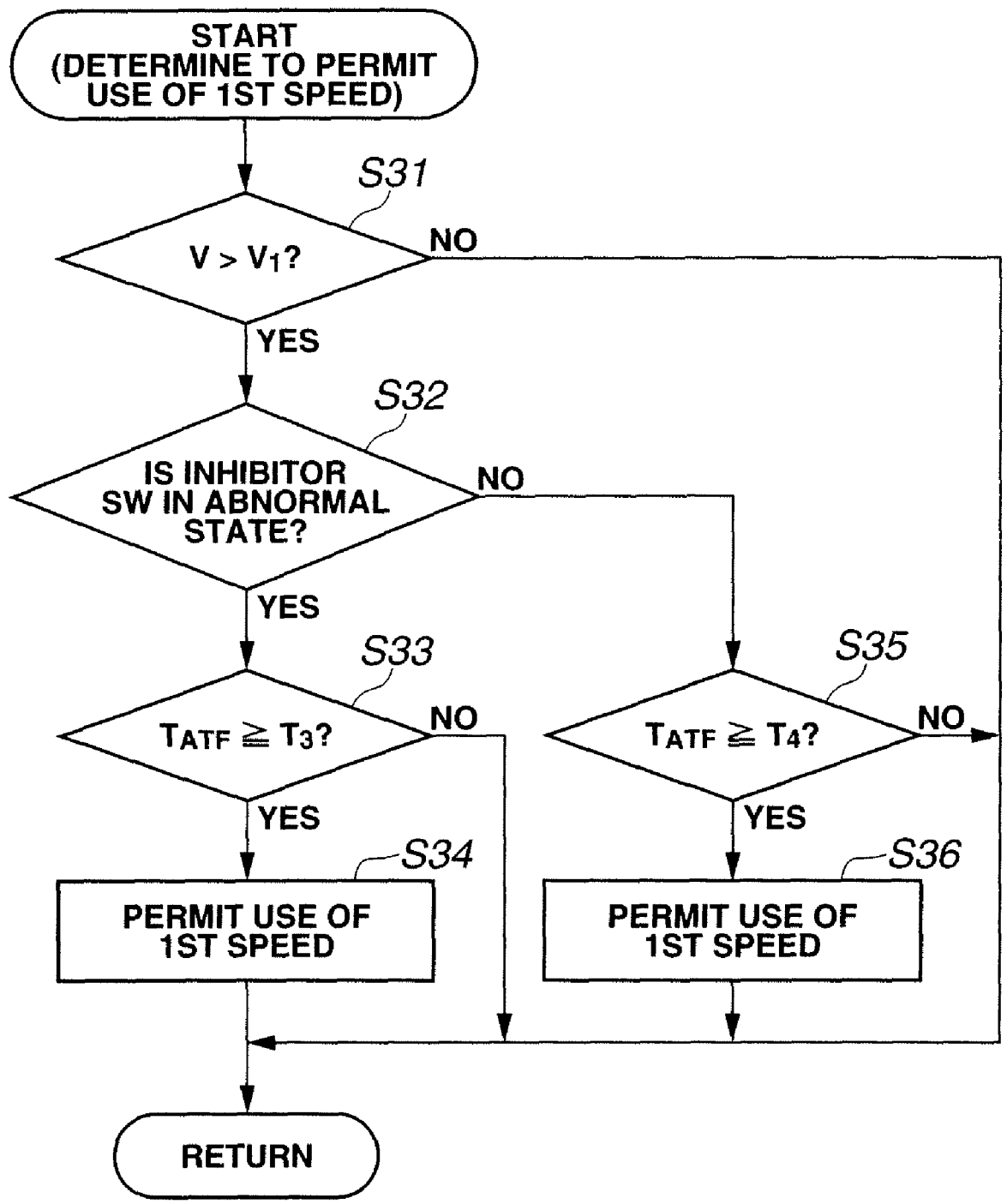
FIG. 8 is a flowchart showing details of determination of permitting use of the first speed which is made by the A/T control unit.

FIG. 8 illustrates the routine of the determination of permitting use of first speed 1ST which is carried out at step S30.

At step S31, a determination as to whether vehicle speed V is higher than predetermined vehicle speed $V_1$ is made. Predetermined vehicle speed $V_1$ is a maximum vehicle speed on 1-2 upshift line in the shift map. For example, predetermined vehicle speed $V_1$ is set at 35 km/h.

If the changeover from the determination of inhibiting use of first speed 1ST to the determination of permitting use of first speed 1ST is conducted under a condition that vehicle speed V is not more than predetermined vehicle speed $V_1$, second speed 2ND will be suddenly shifted down to first speed 1ST. The sudden downshift operation would cause unstable behavior of the vehicle. In this routine of the determination of permitting use of first speed 1ST, only when vehicle speed V is higher than predetermined vehicle speed $V_1$, processes at the subsequent steps S32-S36 are carried out so that such a sudden downshift operation can be avoided. Therefore, when the answer to step S31 is NO, the logic flow returns to step S31.

When the answer to step S31 is YES, the logic flow proceeds to step S32 where a determination as to whether inhibitor switch 45 is in the abnormal state on the basis of the failure flag is made. When the answer to step S31 is YES, indicative that inhibitor switch 45 is in the abnormal state, the logic flow proceeds to step S33. At step S33, a determination as to whether working oil temperature $T_{AFT}$ is not lower than predetermined temperature $T_3$ is made. When the answer to step S33 is YES, indicative that working oil temperature $T_{AFT}$ is not lower than predetermined temperature $T_3$, the logic flow proceeds to step S34 where use of first speed 1ST is permitted. Predetermined temperature $T_3$ is a temperature that is slightly higher than predetermined low temperature $T_1$ and set so as to prevent hunting between the determination of permitting use of first speed 1ST and the determination of inhibiting first speed 1ST. For example, predetermined temperature $T_3$ is set at 0° C.

When the answer to step S32 is NO, indicative that inhibitor switch 45 is in the normal state, the logic flow proceeds to step S35. At step S35, a determination as to whether working oil temperature $T_{AFT}$ is not lower than predetermined temperature $T_4$ is made. When the answer to step S35 is YES, indicative that working oil temperature $T_{AFT}$ is not lower than predetermined temperature $T_4$, the logic flow proceeds to step S36 where use of first speed 1ST is permitted. Predetermined temperature $T_4$ is a temperature that is lower than predetermined low temperature $T_1$ and slightly higher than predetermined extremely low temperature $T_2$ and set so as to prevent hunting between the determination of permitting use of first speed 1ST and the determination of inhibiting first speed 1ST. For example, predetermined temperature $T_4$ is set at −25° C.

Thus, in the determination of permitting use of first speed 1ST at step S30, when either one of the following conditions (a) and (b) is fulfilled, use of first speed 1ST is permitted.
(a) Working oil temperature $T_{AFT}$ is predetermined temperature $T_3$ or more, i.e., $T_{AFT} \geq T_3$.
(b) Working oil temperature $T_{AFT}$ is predetermined temperature $T_4$ or more, i.e., $T_{AFT} \geq T_4$, and inhibitor switch 45 is in the normal state.

Function and effect of the low-temperature shift control that is executed by A/T ECU 40 will be discussed hereinafter.

As explained above, A/T ECU 40 inhibits use of the lowest gear stage, i.e., first speed 1ST, (at steps S74, S75 in FIG. 7) and allows use of a gear stage other than the lowest gear stage which can be established while a lowest gear-stage friction element is kept in disengagement (at step S90 in FIG. 6), when working oil temperature $T_{AFT}$ is lower than predetermined extremely low temperature $T_2$ at which an engagement failure, such as disability and delay in engagement, of the lowest gear-stage friction element is caused due to high viscosity of the working oil. In this embodiment, the lowest gear-stage friction element is low one-way clutch LOW/OWC that is a roller one-way clutch, or the lowest gear-stage friction element is low and reverse brake L&R/B that is disposed parallel to the roller one-way clutch.

By conducting the low-temperature shift control as described above, when working oil temperature $T_{AFT}$ is lower than predetermined extremely low temperature $T_2$, use of the lowest gear stage is inhibited and use of the gear stage other than the lowest gear stage is allowed. As a result, even under the extremely low temperature condition of the working oil, start of the vehicle can be performed without being disabled due to engagement failure in the lowest gear-stage friction element. Further, when the changeover from the gear stage other than the lowest gear stage to the lowest gear stage is attempted by the vehicle driver during the vehicle running, the motive power transmission from the engine can be performed without being disabled and the driving force demanded by the vehicle driver can be obtained.

Further, even in a case where the lowest gear stage is established through engagement of low and reverse brake L&R/B under the extremely low temperature condition of the working oil, use of the lowest gear stage is inhibited and the engagement of low and reverse brake L&R/B is prevented. Therefore, it is possible to avoid the following problems which might be caused under the extremely low temperature condition of the working oil:
(1) Since the controllability of low and reverse brake L&R/B is deteriorated due to high viscosity of the working oil at the extremely low temperature, there will occur offset in engagement timing of low and reverse brake L&R/B to thereby cause shock.
(2) When the changeover from the lowest gear stage to the gear stage other than the lowest gear stage is attempted, it is necessary to drain the engagement pressure for low and reverse brake L&R/B and release low and reverse brake L&R/B. However, draining the engagement pressure for low and reverse brake L&R/B is considerably difficult under the extremely low temperature condition of the working oil, so that drag in low and reverse brake L&R/B might occur.

Further, A/T ECU 40 determines whether inhibitor switch 45 is in an abnormal state. When A/T ECU 40 has determined that inhibitor switch 45 is in the abnormal state, A/T ECU 40 carries out such fail-safe control as to increase an engagement speed of an upstream friction element, i.e., low clutch LOW/C, that is disposed between the lowest gear-stage friction element and the input shaft of automatic transmission 1 and is in engagement when the lowest gear stage is established. If the lowest gear-stage friction element is a roller one-way clutch LOW/OWC, slippage in the roller one-way clutch LOW/OWC will occur due to rapid increase in difference between the rotational speed of inner race IR and the rotational speed of outer race OR which is caused by abrupt engagement of the upstream friction element, even when working oil temperature $T_{AFT}$ is not lower than predetermined extremely low temperature $T_2$ under the fail-safe control. In addition, even if the lowest gear-stage friction element is low and reverse brake L&R/B, there will occur offset in engagement timing of low and reverse brake L&R/B to thereby cause shock due to the deteriorated controllability at the low temperature of the working oil.

Therefore, when A/T ECU 40 has determined that inhibitor switch 45 is in the abnormal state (at step S71 in FIG. 7) and working oil temperature $T_{AFT}$ is lower than predetermined temperature $T_1$ that is higher than predetermined extremely low temperature $T_2$ (at step S72 in FIG. 7), A/T ECU 40 inhibits use of the lowest gear stage (at step S73 in FIG. 7) and allows use of the gear stage other than the lowest gear stage (at step S90 in FIG. 6).

By conducting the low-temperature shift control as described above, the following failure can be suppressed under a condition that inhibitor switch 45 is in the abnormal state and the lowest gear-stage friction element tends to undergo slippage even if the working oil temperature is not extremely low. That is, when start of the vehicle at the lowest gear stage is attempted, failure upon starting the vehicle can be prevented, and when the changeover from the gear stage other than the lowest gear stage to the lowest gear stage is attempted, failure upon transmitting the motive power can be prevented.

In the above-described embodiment, there are provided two threshold values $T_1$ and $T_2$ of temperature relative to working oil temperature $T_{AFT}$ upon determining that use of the lowest gear stage is inhibited. However, one temperature threshold value at which there is present a largest possibility of occurrence of slippage in the lowest gear-stage friction element may be used. In such a case, when working oil temperature $T_{AFT}$ is lower than the one temperature threshold value and inhibitor switch 45 is in the abnormal state, use of the lowest gear stage is inhibited. In this case, the one temperature threshold value corresponds to the predetermined extremely low temperature. The one temperature threshold value may be set to a value between value $T_1$ and value $T_2$ or may be set to a value that is equal to any of value $T_1$ and value $T_2$.

Furthermore, in the low-temperature shift control as described above, a gear stage (2ND gear stage in the above-described embodiment) that has a largest gear ratio among the gear stages other than the lowest gear stage is selected as the gear stage other than the lowest gear stage which is used when use of the lowest gear stage is inhibited. As a result, deterioration in startability and drivability which would be caused by non-use of the lowest gear stage can be suppressed to a minimum.

This application is based on a prior Japanese Patent Application No. 2006-259005 filed on Sep. 25, 2006. The entire contents of the Japanese Patent Application No. 2006-259005 is hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is:

1. A system for controlling an automatic transmission, the automatic transmission comprising a plurality of friction elements which come into engagement upon being supplied with a working oil and include a lowest gear-stage friction element, the automatic transmission having a lowest gear stage that has a largest gear ratio and a gear stage other than the lowest gear stage, the lowest gear stage being established through engagement of the lowest gear-stage friction element, the gear stage other than the lowest gear stage being established while the lowest gear-stage friction element is kept in disengagement, the system comprising:
   a sensor that senses a temperature of the working oil in the automatic transmission; and
   an electronic control unit operative depending on the sensed temperature, the electronic control unit being programmed to:
   inhibit use of the lowest gear stage and allow use of the gear stage other than the lowest gear stage when the sensed temperature of the working oil is lower than a first predetermined temperature as a predetermined extremely low temperature at which an engagement failure of the lowest gear-stage friction element is caused.

2. The system as claimed in claim 1, wherein the automatic transmission further comprises an input shaft and the plurality of friction elements further comprise an upstream friction element disposed between the lowest gear-stage friction element and the input shaft, the upstream friction element being in engagement when the lowest gear stage is established, the system further comprising an inhibitor switch connected to the electronic control unit, and the electronic control unit is programmed to:
   determine that the inhibitor switch is in an abnormal state;
   increase an engagement speed of the upstream friction element when it has been determined that the inhibitor switch is in the abnormal state; and
   inhibit use of the lowest gear stage and allow use of the gear stage other than the lowest gear stage when it has been determined that the inhibitor switch is in the abnormal state and the sensed temperature of the working oil is lower than a second predetermined temperature that is higher than the first predetermined temperature.

3. The system as claimed in claim 2, wherein the electronic control unit is further programmed to permit use of the lowest gear stage when it has been determined that the inhibitor switch is in the abnormal state and the sensed temperature of the working oil is not lower than a third predetermined temperature that is higher than the second predetermined temperature.

4. The system as claimed in claim 2, wherein the electronic control unit is further programmed to permit use of the lowest gear stage when it has been determined that the inhibitor switch is in a normal state and the sensed temperature of the working oil is not lower than a fourth predetermined temperature that is higher than the first predetermined temperature and lower than the second predetermined temperature.

5. The system as claimed in claim 1, wherein the automatic transmission further comprises an input shaft and the plurality of friction elements further comprise an upstream friction element disposed between the lowest gear-stage friction element and the input shaft, the upstream friction element being in engagement when the lowest gear stage is established, the system further comprising an inhibitor switch connected to the electronic control unit, wherein the electronic control unit is programmed to:
   determine that the inhibitor switch is in an abnormal state;
   increase an engagement speed of the upstream friction element when it has been determined that the inhibitor switch is in the abnormal state; and
   inhibit use of the lowest gear stage and allow use of the gear stage other than the lowest gear stage when it has been determined that the inhibitor switch is in the abnormal state and the sensed temperature of the working oil is lower than the first predetermined temperature.

6. The system as claimed in claim 1, wherein the gear stage other than the lowest gear stage is a gear stage that has a largest gear ratio among gear stages which are established while the lowest gear-stage friction element is kept in disengagement.

7. An automatic transmission having a lowest gear stage that has a largest gear ratio and a gear stage other than the lowest gear stage, the automatic transmission comprising:
   a plurality of friction elements which come into engagement upon being supplied with a working oil, the plurality of friction elements including a lowest gear-stage friction element that is in engagement when the lowest gear stage is established, the lowest gear-stage friction element being kept in disengagement when the gear stage other than the lowest gear stage is established;
   a sensor that senses a temperature of the working oil in the automatic transmission; and
   an electronic control unit operative depending on the sensed temperature, the electronic control unit being programmed to:
   inhibit use of the lowest gear stage and allow use of the gear stage other than the lowest gear stage when the sensed temperature of the working oil is lower than a first predetermined temperature as a predetermined extremely low temperature at which an engagement failure of the lowest gear-stage friction element is caused.

8. The automatic transmission as claimed in claim 7, wherein the lowest gear-stage friction element is a roller one-way clutch.

9. The automatic transmission as claimed in claim 7, wherein the plurality of friction elements comprise a roller one-way clutch, and the lowest gear-stage friction element is a friction element that is disposed parallel to the roller one-way clutch.

10. The automatic transmission as claimed in claim 7, further comprising an input shaft and an inhibitor switch connected to the electronic control unit, wherein the plurality of friction elements comprise an upstream friction element disposed between the lowest gear-stage friction element and the input shaft, the upstream friction element being in engagement when the lowest gear stage is established, and wherein the electronic control unit is programmed to:
   determine that the inhibitor switch is in an abnormal state;
   increase an engagement speed of the upstream friction element, when it has been determined that the inhibitor switch is in the abnormal state; and
   inhibit use of the lowest gear stage and allow use of the gear stage other than the lowest gear stage when it has been determined that the inhibitor switch is in the abnormal state and the sensed temperature of working oil is lower than a second predetermined temperature that is higher than the first predetermined temperature.

11. The automatic transmission as claimed in claim 10, wherein the electronic control unit is further programmed to permit use of the lowest gear stage when it has been determined that the inhibitor switch is in the abnormal state and the sensed temperature of the working oil is not lower than a third predetermined temperature that is higher than the second predetermined temperature.

12. The automatic transmission as claimed in claim 10, wherein the electronic control unit is further programmed to permit use of the lowest gear stage when it has been determined that the inhibitor switch is in a normal state and the sensed temperature of the working oil is not lower than a fourth predetermined temperature that is higher than the first predetermined temperature and lower than the second predetermined temperature.

13. The automatic transmission as claimed in claim 7, further comprising an input shaft and an inhibitor switch connected to the electronic control unit, wherein the plurality of friction elements comprise an upstream friction element disposed between the lowest gear-stage friction element and the input shaft, the upstream friction element being in engagement when the lowest gear stage is established, and wherein the electronic control unit is programmed to:
   determine that an inhibitor switch in the automatic transmission is in an abnormal state;
   increase an engagement speed of the upstream friction element when it has been determined that the inhibitor switch is in the abnormal state; and
   inhibit use of the lowest gear stage and allow use of the gear stage other than the lowest gear stage when it has been determined that the inhibitor switch is in the abnormal state and the sensed temperature of working oil is lower than the first predetermined temperature.

14. The automatic transmission as claimed in claim 7, wherein the gear stage other than the lowest gear stage is a gear stage that has a largest gear ratio among gear stages which are established while the lowest gear-stage friction element is kept in disengagement.

15. A method of controlling an automatic transmission, the automatic transmission comprising a plurality of friction elements which come into engagement upon being supplied with a working oil and include a lowest gear-stage friction element, the automatic transmission having a lowest gear stage that has a largest gear ratio and a gear stage other than the lowest gear stage, the lowest gear stage being established through engagement of the lowest gear-stage friction element, the gear stage other than the lowest gear stage being established while the lowest gear-stage friction element is kept in disengagement, the method comprising the steps of:
   sensing a temperature of the working oil in the automatic transmission; and
   inhibiting use of the lowest gear stage and allowing use of the gear stage other than the lowest gear stage when the sensed temperature of the working oil is lower than a first predetermined temperature as a predetermined extremely low temperature at which an engagement failure of the lowest gear-stage friction element is caused.

16. The method as claimed in claim 15, wherein the automatic transmission further comprises an input shaft, an inhibitor switch and an upstream friction element disposed between the lowest gear-stage friction element and the input shaft, the upstream friction element being in engagement when the lowest gear stage is established, the method further comprising the steps of:
   determining that the inhibitor switch is in an abnormal state;
   increasing an engagement speed of the upstream friction element when it has been determined that the inhibitor switch is in the abnormal state; and
   inhibiting use of the lowest gear stage and allowing use of the gear stage other than the lowest gear stage when it has been determined that the inhibitor switch is in the abnormal state and the sensed temperature of the working oil is lower than a second predetermined temperature that is higher than the first predetermined temperature.

17. The method as claimed in claim 16, further comprising the step of permitting use of the lowest gear stage when it has been determined that the inhibitor switch is in the abnormal state and the sensed temperature of the working oil is not lower than a third predetermined temperature that is higher than the second predetermined temperature.

18. The method as claimed in claim 16, further comprising the step of permitting use of the lowest gear stage when it has been determined that the inhibitor switch is in a normal state and the sensed temperature of the working oil is not lower than a fourth predetermined temperature that is higher than the first predetermined temperature and lower than the second predetermined temperature.

19. The method as claimed in claim 15, wherein the automatic transmission further comprises an input shaft, an inhibitor switch and an upstream friction element disposed between the lowest gear-stage friction element and the input shaft, the upstream friction element being in engagement when the lowest gear stage is established, the method further comprising the steps of:
   determining that the inhibitor switch is in an abnormal state;
   increasing an engaging speed of the upstream friction element when it has been determined that the inhibitor switch is in the abnormal state; and
   inhibiting use of the lowest gear stage and allowing use of the gear stage other than the lowest gear stage when it has been determined that the inhibitor switch is in the abnormal state and the sensed temperature of the working oil is lower than the first predetermined temperature.

20. The method as claimed in claim 15, wherein the gear stage other than the lowest gear stage is a gear stage that has a largest gear ratio among gear stages which are established while the lowest gear-stage friction element is kept in disengagement.

* * * * *